US006675781B1

(12) United States Patent
Markley

(10) Patent No.: US 6,675,781 B1
(45) Date of Patent: Jan. 13, 2004

(54) ENGINE CHARGE AIR COOLING SYSTEM

(76) Inventor: David Lee Markley, 156 Elm Ct., Chagrin Falls, OH (US) 44022

( * ) Notice: Subject to any disclaimer, the term of this patent is extended or adjusted under 35 U.S.C. 154(b) by 0 days.

(21) Appl. No.: 10/293,552

(22) Filed: Nov. 14, 2002

(51) Int. Cl.[7] ............................................. F02M 31/00
(52) U.S. Cl. ..................................................... 123/542
(58) Field of Search ................ 123/542, 540; 165/32

(56) References Cited

U.S. PATENT DOCUMENTS 4,058,096 A * 11/1977 Brown ....................... 123/542
4,858,678 A * 8/1989 Ladd ........................... 165/32

* cited by examiner

Primary Examiner—Marguerite McMahon

(57) ABSTRACT

A system to cool the charge air of an engine including a cylinder, a cylinder valve, a delivery hose, a cryogen, an aerodynamic, hollow heat exchanger with inlet and outlet ports which is charged or frozen by passing the cryogen such as nitrous oxide, carbon dioxide, nitrogen or other such gas or liquid with cryogenic properties through the device. The heat is transferred from the body of the heat exchanger to the circulating cryogen thus freezing the body of the heat exchanger. The heat exchanger is installed in the charge air flow as not to disrupt the flow and the heat from the charge air is transferred to the frozen heat exchanger as they come in contact. The heat exchanger can be installed into the existing charge air intake system or be preinstalled in an attachable segment of air charge tube that can be mounted into the current charge air intake system of an engine. The introduction of the cryogen to the system is through a delivery hose and can be channeled through solenoid valve, which may control the flow of the cryogen. The cryogen is exhausted from the heat exchanger either into the charge air intake system, into additional heat exchangers or into the atmosphere.

6 Claims, 2 Drawing Sheets

ENGINE CHARGE AIR COOLING SYSTEM

UTILITY PATENT APPLICATION SPECIFICATIONS

Cross Reference to Related Applications:

| Patent number | Date | Name |
| --- | --- | --- |
| 577894 | March 1897 | Wade |
| 1333841 | March 1920 | Dummer |
| 2047249 | July 1936 | Ballard |
| 2399484 | April 1946 | Gunter |
| 2869834 | January 1959 | Clark, Jr. et al. |
| 2991048 | July 1961 | Rabin |
| 3050956 | August 1962 | Mann et al. |
| 3099914 | August 1963 | De Witt et al. |
| 3147800 | September 1964 | Tadewald |
| 3261173 | July 1966 | Gould |
| 3577961 | May 1971 | Deutschmann |
| 3700029 | October 1972 | Thrun |
| 3748830 | July 1973 | Ross et al. |
| 4155337 | May 1979 | Hensley |
| 4683725 | August 1987 | Sugiura |
| 4823868 | April 1989 | Neebel |
| 4899814 | February 1990 | Price |
| 4938036 | July 1990 | Hodgkins et al. |
| 5156134 | October 1992 | Tochizawa |
| 5251603 | October 1993 | Watanabe et al. |
| 5299633 | April 1994 | Bruggermann et al. |
| 5320167 | June 1994 | Johnson et al. |
| 5394854 | March 1995 | Edmaier |
| 5435289 | July 1995 | Pendlebury et al |
| 5871001 | February 1999 | Pelkey |
| 5875837 | March 1999 | Hughes |
| Foreign Patent Documents: | | |
| 295012 | October 1991 | DE |
| 4143254 | July 1992 | DE |
| 004141556 | June 1993 | DE |
| 0285504 | June 1988 | EP |
| 648409 | January 1951 | GB |
| 780082 | July 1957 | GB |
| 2000583 | January 1979 | GB |
| 00 87595 | April 1988 | JP |
| 00 87596 | April 1988 | JP |
| 4-43278 | February 1992 | JP |

STATEMENT REGARDING FEDERAL SPONSORED R&D

I have received no support from federal sponsored research and development programs.

BACKGROUND OF THE INVENTION

1. Field of the Invention

The present invention relates to charge air cooler and more particularly pertains to a new engine charge air cooler for providing greater cooling of the charge air received by an engine employing the invention.

2. Description of Prior Art

The use of air charge coolers is known in prior art. Internal combustion engines compress a mixture of air and fuel in a cylinder and ignite that mixture to create the combustion. By harnessing the energy created by this combustion power is created. The more oxygen molecules contained in the cylinder at the time of combustion the more can be harnessed. The colder the air charge the denser the oxygen molecules thus the more oxygen molecules in the cylinder at the time of combustion equaling more power. Turbochargers and supercharges utilize anther method to get more oxygen into the cylinder. They compress the air to make it denser. This also adds power but by compressing the air it also heats the air charge which can leave potential power unrealized. In turbocharged and supercharged application an intercooler is often used to cool the compressed air charge. An intercooler is an "air-to-air" heat exchanger where the hot compressed air charge is cooled by the cooler ambient air flowing over the fins of the intercooler. This system is much less effective when the vehicle is not moving. The effectiveness of an intercooler is also reliant on the ambient atmospheric temperature.

Other air charge coolers utilize a compressor to circulate a refrigerant through a heat exchanger or as an addition to an existing refrigerant circulation system like the air conditioning system in a vehicle. In order to power the compressor used in this type of system either mechanical energy from the engine or electrical power must be used to circulate the refrigerant through the system reducing the efficiency of the engine.

The engine charge air cooler according to the present invention dramatically departs from the conventional concepts and prior art, and in doing so provides a system primarily developed for the purpose of providing enhanced cooling of the charge air received by an engine employing the invention.

SUMMARY OF THE INVENTION

In light of the foregoing disadvantages inherent in the known types of air charge coolers now present in the prior art, the present invention provides a new engine charge air cooler system wherein the same can be utilized for providing enhanced cooling of the charge air received by an engine employing the invention.

The general purpose of the present invention, which will be described subsequently in greater detail, is to provide a new engine charge air cooler apparatus which has many of the advantages of the charge air coolers mentioned heretofore and many novel features that result in a new engine charge air cooler which is not anticipated, rendered obvious, suggested, or even implied by any of the prior art charge air coolers, either alone or in combination thereof.

To attain this, the present invention generally comprises an enhanced charge air cooling system for an internal combustion engine in a vehicle. The charge air cooling system comprises a cryogen storage cylinder of adequate strength to house the cryogen contained in it. The cylinder can be made from aluminum, steel or any material capable of tolerating the cryogen contained within it. The cylinder will have a valve also compatible with the cryogen contained in the cylinder. The wave will have a handle to open close the flow of the cryogen to the air charge cooling system. The valve may also have a siphon tube installed on it. A siphon tube draws the cryogen from the bottom of the cylinder rather than from the top. The siphon tube will only need to be installed in certain situations. This will be discussed more later.

The engine air charge cooling system will also have a cryogen, which will be utilized to freeze the heat exchanger. The cryogen is a gas or a gas in liquid state that is extremely cold. Typically, this cryogen will be stored in the aforementioned cylinder. Some typical cryogen's are nitrous oxide, carbon dioxide, and nitrogen but other would also be suitable for charging this air charge cooler. The three cryogen's mentioned are well suited for this invention because they are safe to use, are readily available to consumers, and are extremely cold in the liquid state. These gases when contained in the cylinder will take 2 forms in the cylinder, a gas form and a liquid form. If the cylinder is standing straight up, the gas would rise to the top of the cylinder and the liquid would be below. It is advantageous to utilize the liquid form of the cryogen's as it is much colder than the gas form. In order to access the liquid gas in a cylinder either the cylinder must be mounted upside down so the gas is now at the bottom of the cylinder or a siphon tube must be used to draw the liquid from the bottom of the cylinder while the cylinder is standing straight up. The present invention will work with either form of cryogen, gas or liquid.

Attached to the cylinder valve will be a hose capable of handling the chosen cryogen's temperature range and pressure. The hose will attach to the cylinder using air tight fittings capable of handling the cryogen's temperature and pressure range. The hose will terminate at the optional solenoid valve. The solenoid valve must be "normally closed, energize to open" type valve capable of handling the temperature and pressure range of the chosen cryogen. If the air charge cooling system utilizes the aforementioned solenoid valve, the cryogen will be deployed by opening the cylinder valve to release the cryogen to the solenoid valve then energizing the solenoid valve to release the cryogen to freeze the heat exchanger. The solenoid valve may be energized by any "electrical circuit completing" switch. If a solenoid valve is not utilized the flow of the cryogen must be controlled by the cylinder valve handle by twisting to the open position allowing the cryogen to flow. The optional solenoid valve will attach directly to the heat exchanger if the solenoid option is incorporated into the system.

The air charge cooler heat exchanger is a device that has a hollow cryogen circulation chamber. The heat exchanger has a cryogen inlet and outlet port which both are open to the cryogen circulation chamber. The shape of the heat exchanger can be aerodynamic in design as to minimize the restriction of the air charge flow and disturbance to the air charge flow as it comes in contact with the heat exchanger. An excellent shape for the heat exchanger is the symmetrical wing shape but other shapes can also be effective. The heat exchanger can be sealed to keep the cryogen out of the air charge flow or can be vented to allow the cryogen to mix with the air charge if an advantage is gained by this introduction of the cryogen into the air charge. The heat exchanger, if an aerodynamic shape should be positioned in the air charge flow such that maximum benefit is gained from the shape. The heat exchanger should be made of a material that has excellent heat transfer properties and is capable of handling the pressure and temperature of the cryogen. Aluminum and copper are two excellent materials from which to make the heat exchanger although other material can be used.

The air charge cooling system is initiated by releasing the cryogen from the cylinder either by opening the cylinder valve or opening the cylinder valve then energizing the solenoid valve. The cryogen will flow from the cylinder, in a gas or liquid state, through the cylinder valve, through the hose, through the solenoid valve, if incorporated, and into the inlet of the heat exchanger. The cryogen will circulate and fill the chamber drawing the heat from the heat exchanger into the cryogen thus freezing the heat exchanger. The cryogen will then escape the cryogen chamber through the outlet port or if it is advantageous to vent the cryogen into the air charge flow, the cryogen will vent through outlet vents into the air charge flow. The air charge will flow over the heat exchanger and heat will be remover from the air charge thus cooling the air charge providing a denser air charge and creating additional power from the engine.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the providing enhanced cooling of the charge air received by an engine employing the invention of description and should not be regarded as limiting.

As such, those skilled in the art will appreciate that the conception, upon which this disclosure is based, may readily be utilized as a basis for the designing of other structures, methods and systems for carrying out the several providing cooling of the charge air received by an engine employing the invention of the present invention. It is important to, therefore, that the claims be regarded as including such equivalent constructions insofar as they do not depart from the spirit and scope of the present invention.

The use of the invention provide charge air cooling on demand with out the need for compressors which can decrease engine power.

The use of this invention permits cooling of the air charge without the efficiency of the cooling being significantly affected by the temperatures of the ambient air.

The use of the invention permits the invention to be installed in the existing charge air intake system of a vehicle.

These together with other objects of the invention, along with the various features of novelty which characterize the invention, are pointed out particularity in the claims annexed to and forming a part of this disclosure. For a better understanding of the invention, its operating advantages and the specific object attained by its use, references should be made to the accompanying drawings and descriptive matter in which there illustrated preferred embodiments of the invention.

DETAILED DESCRIPTION

Figure 1:
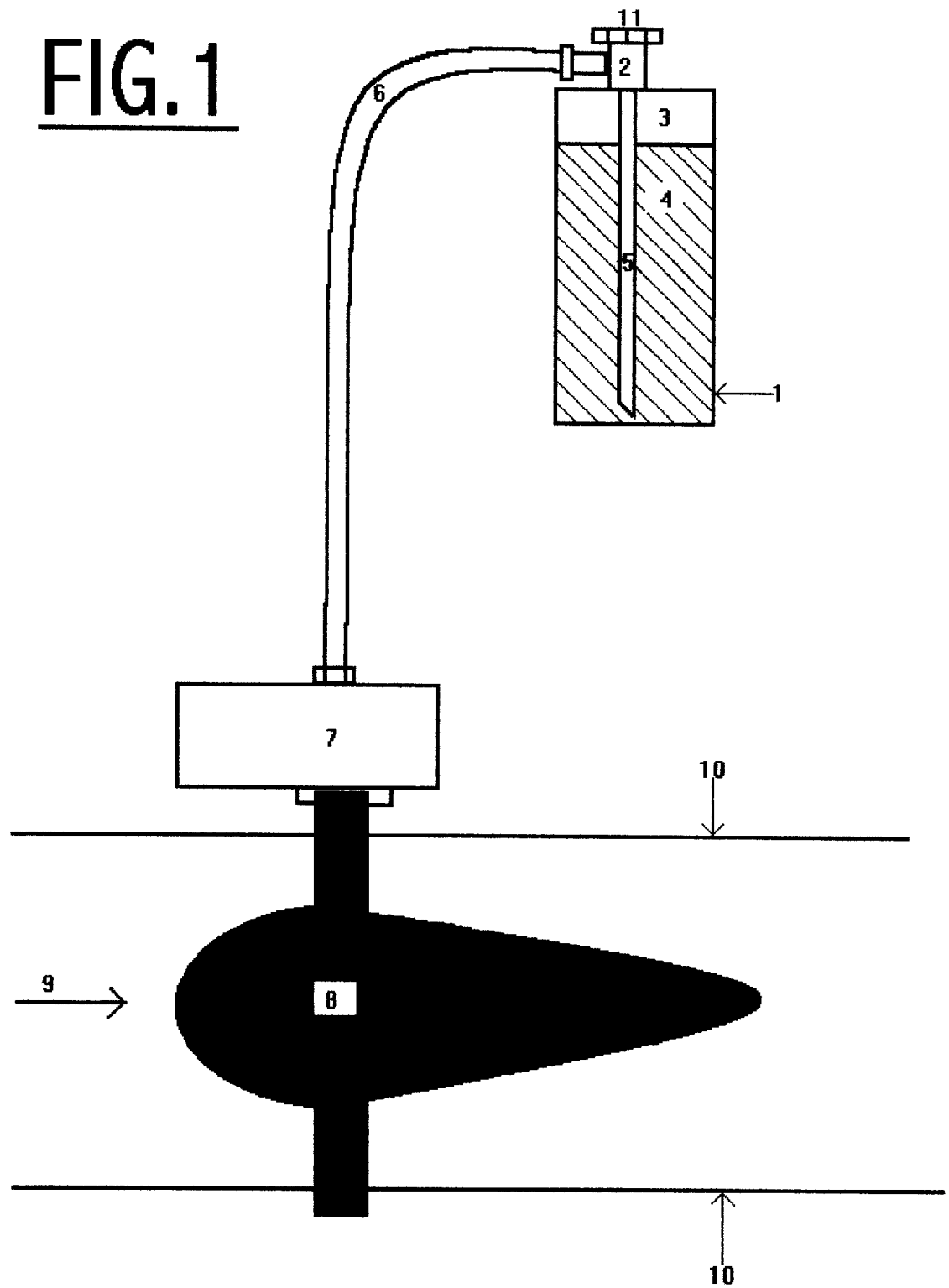
FIG. 1 is a schematic diagram of the components that make up the new engine charge air cooler system according to the present invention.
Figure 2:
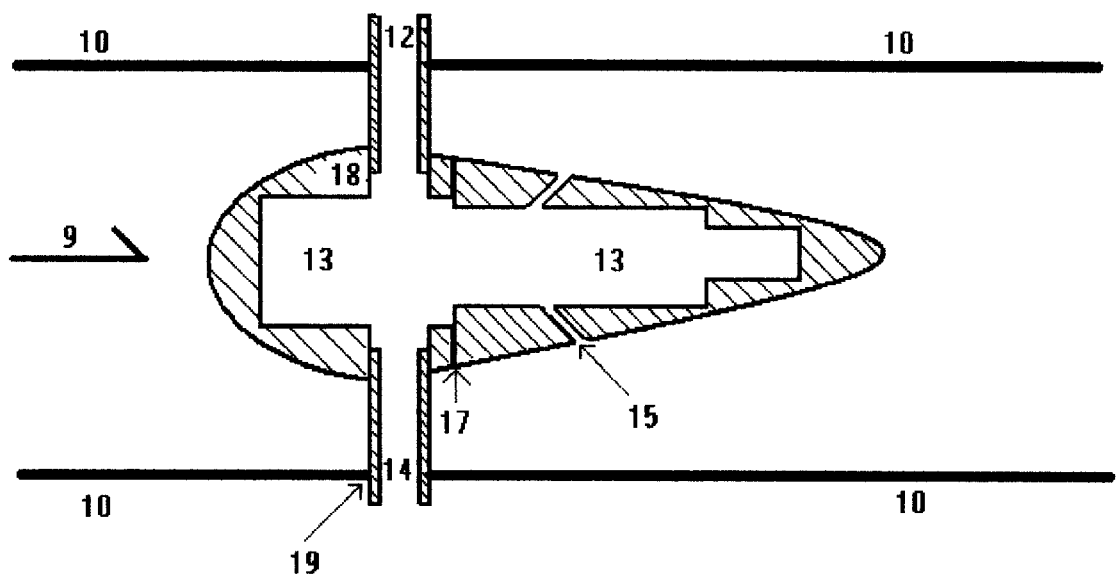
FIG. 2 is a cross section schematic of an embodiment of the heat exchanger component of the new engine charge air cooling system.

With reference now to the drawings, and in particular to FIGS. 1 through 2 thereof, a new engine charge air cooling system embodying the principles and concepts of the present invention.

As best illustrated, FIG. 1 is a schematic of the components that make up the new charge air cooling system. The cryogen holding cylinder 1, is the first component in the system, holding the cryogen which will flow through the system. The cylinder can be made of a metal such as, for example, aluminum, which is capable of tolerating the cryogen in this embodiment. A top the cylinder is a valve 2 which is capable of tolerating the cryogen in this embodiment. The valve has a handle 11 which is used to open and close the flow of the cryogen from the cylinder 1. The cryogen, such as, for example carbon dioxide, which resides in the cylinder 1 is in two forms while in the cylinder. Carbon dioxide gas 3, which is always at the highest point in the cylinder and liquid carbon dioxide 4 which is always below the carbon dioxide gas 3.

A siphon tube 5 is attached to the valve 2 such that when the valve is opened the liquid carbon dioxide is drawn from the bottom of the tank rather than the gas from the top of the tank. Typically, the liquid form of a cryogen is colder than the gas state of a cryogen so it is preferable to utilize the liquid form for this embodiment. The siphon tube 5 would be considered optional.

A hose 6 is connected to the valve 2 and will direct the flow of cryogen to the solenoid valve 7. The hose should be capable of handling the temperature and pressure of the cryogen in this embodiment it would be a stainless steel braided covering over a teflon hose. The hose is connected to the inlet of the solenoid valve 7 using standard fittings. The heat exchanger 8 is attached directly to the solenoid valve 7 by the cryogen inlet port 12 of heat exchanger. The solenoid valve is a "normally closed energize to open" type solenoid valve capable of handling the temperatures and pressures of carbon dioxide.

The embodiment shown in FIG. 1 shows the heat exchanger 8 installed in the existing charge air delivery system 10 of a vehicle. The charge air flow direction 9 illustrates the proper orientation of the heat exchanger to maximize the aerodynamic symmetric wing shape of the heat exchanger. This shape would minimize restriction of the charge air flow and while also minimizing the turbulence of the charge air. The heat exchanger would need to be securely anchored to the vehicles charge air system 19 using welding, epoxy or mechanical fastening to ensure the proper orientation is maintained. The heat exchanger can be a bulb or a wing shape much like an air plane FIG. 2. Is a cross section of the heat exchanger 8 installed in an existing charge air intake system of a vehicle 10. The heat exchanger can be a bulb or a wing shape much like an air plane wing installed in the charge air flow, the symmetric wing shape will work with both designs. The heat exchanger has a cryogen inlet port 12,which accepts the cryogen into the heat exchanger 8. The heat exchanger 8 also has a cryogen circulation chamber 13 which is a hollow cavity in the heat exchanger where the cryogen circulates and removes the heat from the body 18 of the heat exchanger causing the body to freeze. The cryogen circulation chamber 13 should be maximized to reduce the area of body 18, which will need to have the heat removed before freezing takes place. If it would be advantageous to vent the cryogen into the charge air than optional vent holes 15 could be drilled through the heat exchanger body 18 to intersect into the cryogen circulation chamber 13. In this embodiment using carbon dioxide it would not be beneficial to vent into the charge air flow.

One way to manufacture the heat exchanger was to cut the body 18 in half drill out the cryogen circulation chamber 13 and re-attach the 2 halves using an epoxy 17. Once that is complete a hole was drilled to intersect the cryogen circulation chamber 13 and pipe was epoxied in place to form the cryogen inlet port 12 and cryogen outlet port 14.

The new charge air cooling system depicted in FIGS. 1 through 2 would operate by first opening the cylinder valve 2 by rotating the cylinder valve handle 11 to the open position. The carbon dioxide would advance to the solenoid valve 7. The solenoid valve 7 would be energized to the open position and the cryogen would advance through the cryogen inlet port 12 and into the cryogen circulation chamber where the initial heat exchange would take place with the heat exchanger body 18 by removing the heat from the body 8 the body would freeze. The cryogen circulates in the cryogen circulation chamber under the pressure of the cryogen and exits through the cryogen outlet port 14. The charge air will be flowing over the heat exchanger 8 and removing heat from the charge air as it comes in contact with the heat exchanger body 18 thus cooling the charge air.

A further option could add a vent cap (not shown) to the outlet port 14 to contain the cryogen in the cryogen circulation chamber 13 and maintain a higher cryogen pressure while in the chamber 13.

As to further discussions of the manner of usage and operation of the present invention, the same should be apparent from the above description. Accordingly, no further discussion relating to the manner of usage and operation will be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A charge air cooling system for an internal combustion engine, the enhanced charge air cooling system comprising:

a cylinder containing cryogen, a cylinder valve with a handle to release the cryogen, the cryogen contained in the cylinder can be utilized in gas or liquid state, a cryogen delivery hose, a solenoid valve of the "normally closed, energize to open" type, an aerodynamic, hollow heat exchanger that consists of:

a cryogen inlet port to receive the cryogen into the heat exchanger, a cryogen outlet port, a heat exchanger body which holds an aerodynamic shape and includes a cryogen circulation chamber which removes heat from the body by circulating the cryogen thus freezing the body, the charge air flowing over the body and heat being removed from the charge air, and optional cryogen vents dispersing cryogen into the charge air flow.

2. The charge air cooling system of claim 1 wherein the frozen body of the heat exchanger comes in contact with the charge air of an internal combustion engine and heat is removed from the charge air.

3. The charge air cooling system of claim 1 wherein the heat exchanger may be installed into existing charge air intake systems.

4. The charge air cooling system of claim 1 wherein the heat exchanger is of an aerodynamic shape as to minimize the disruption of charge air flow as the heat exchange takes place.

5. The charge air cooling system of claim 1 wherein the heat exchanger is of an aerodynamic shape as to reduce turbulence in the charge air flow as the heat exchange takes place.

6. The charge air cooling system of claim 1 wherein he heat exchanger may have vents through the body into the cryogen circulation chamber to disperse the cryogen into the charge air flow if a benefit would be derived from dispersing the cryogen into the charge air flow.

* * * * *